United States Patent [19]

Weir et al.

[11] 4,330,508

[45] May 18, 1982

[54] REMOVAL OF SELENIUM (IV) AND (VI) FROM ACIDIC COPPER SULPHATE SOLUTIONS

[75] Inventors: Donald R. Weir; Derek G. E. Kerfoot; Hugh C. Scheie, all of Fort Saskatchewan, Canada

[73] Assignee: Sherritt Gordon Mines Limited, Toronto, Canada

[21] Appl. No.: 200,126

[22] Filed: Oct. 24, 1980

[30] Foreign Application Priority Data

Aug. 19, 1980 [CA] Canada ................................ 358594

[51] Int. Cl.$^3$ ............................................ C01B 19/04
[52] U.S. Cl. .................................... 423/42; 423/509; 423/557; 423/43
[58] Field of Search ................... 423/42, 43, 508–510; 75/117, 121

[56] References Cited

U.S. PATENT DOCUMENTS 3,436,177  4/1969  Spedden .............................. 423/43
3,730,700  5/1973  Groenveld .......................... 423/310
3,914,375  10/1975  Clark .................................. 423/43

OTHER PUBLICATIONS

Perry, Chemical Engineer's Handbook, 5th Ed., McGraw-Hill, N.Y., (1973), pp. 4-20 to 4-25, 4-27, 4-28.
Griskey, *Chemical Engineering for Chemists*, ACS, Washington, D.C., (1979), pp. 3, 5-8.
Zingaro, *Selenium*, Van Nostrand Reinhold, NY, (1974), pp. 56-60.

*Primary Examiner*—Brian E. Hearn
*Attorney, Agent, or Firm*—Robert F. Delbridge; Arne I. Fors

[57] ABSTRACT

A process for removing dissolved selenium IV values from an acidic aqueous copper sulphate solution includes passing the solution through a tubular member in a plug flow manner and injecting sulphur dioxide or a sulphite solution into the solution as it enters the tubular member. When the sulphate solution also contains dissolved selenium (VI) values, the ratio of dissolved selenium (IV) values to dissolved selenium (VI) values is preferably at least 3 to 1.

6 Claims, No Drawings

REMOVAL OF SELENIUM (IV) AND (VI) FROM ACIDIC COPPER SULPHATE SOLUTIONS

This invention relates to the removal of dissolved selenium values from acidic aqueous copper sulphate solutions.

Many processes for the recovery of copper from its ores include an electrowinning step in which an acidic copper sulphate solution is electrolyzed to deposit elemental copper on the cathode of an electrolytic cell. Copper ores frequently also contain selenium and, as a result of the treatment of such ore culminating in the production of the acidic copper sulphate solution to be electrolyzed, dissolved selenium values will probably be present in the copper sulphate solution. The dissolved selenium values are usually present as tetravalent selenium (IV) and hexavalent selenium (VI).

Selenium (IV) tends to co-deposit with the copper on the cathode of the electrolytic cell, thereby contaminating the copper product. The presence of selenium in the copper product adversely affects the physical properties of the copper, and consequently it is desirable to remove substantially all the dissolved selenium (IV) values from the copper sulphate solution before the electrowinning step. In practical terms, this means that it usually necessary to reduce the concentration of dissolved selenium (IV) values to less than about 1 mg/l (milligrams per liter).

Although dissolved selenium (VI) does not co-deposit with copper in the electrowinning step to the same degree as dissolved selenium (IV) values, it is nevertheless also usually desirable to remove dissolved selenium (VI) values. The acidic copper sulphate solution frequently also contains other dissolved metal values such as nickel, which are recovered from the solution after the copper electrowinning step, and dissolved selenium (VI) values may contaminate this other product. The concentration of dissolved selenium (VI) values should preferably be reduced to less than about 10 mg/L.

Various processes have previously been proposed for removing selenium from acidic copper sulphate solutions, but for one reason or another such known processes are not particularly suitable when the solution is to be subjected to a copper electrowinning step. For example, it is known to precipitate selenium (IV) at atmospheric pressure in an open vessel or in a contacting column using sulphur dioxide or sodium sulphite as reductant. With this known process, it is difficult to reduce the dissolved selenium (IV) concentration to the low level required for the copper electrowinning step in order to produce copper which is sufficiently free from selenium. Also, this method is not normally capable of precipitating selenium (VI) except in the presence of a catalyst such as a halide or thiourea. The use of such a catalyst is very likely to contaminate the acidic copper sulphate solution and render it unsuitable for a subsequent copper electrowinning operation.

It is also known that selenium (IV) can be precipitated from acidic copper sulphate solutions by sulphur dioxide under a pressure of from about 10 to 100 psi at a temperature of from about 110° to 170° C., the precipitated product being a mixture of cuprous selenide and copper powder.

It is also known that selenium (VI) can be precipitated by treating the acidic copper sulphate solution with metallic copper powder at a temperature near the boiling point of the solution, with the precipitate being copper selenide. However, to achieve a practical reaction rate, a temperature of at least about 160° C. is required.

Other known processes include the reduction of selenium (VI) to selenium (IV) at a temperature of about 225° C. with hydrogen at a partial pressure of 40-60 atmospheres. Selenium (VI) can also be removed by using nickel, cobalt or iron powder as a reducing agent at a temperature of at least about 190° C. The reaction mechanism apparently involves the initial reduction of cupric ions to cuprous ions, which then react with selenate ions to precipitate copper selenide.

In all the above mentioned prior processes, it has been necessary to effect selenium (VI) removal at a high temperature in a pressure autoclave in order to achieve both a practical rate of reaction for industrial applications and the low levels of selenium required for a copper electrowinning operation.

It is known to reduce the selenium (IV) content of a chloride-containing acidic copper sulphate solution by passing the solution together with a suspension of cuprous oxide through a plug-flow reactor to precipitate cuprous chloride with simultaneous precipitation of cuprous selenide. Although the reaction time is very short, i.e. less than 30 seconds, disadvantages of the process so far as selenium (IV) removal is concerned are that cuprous oxide is not usually readily available an an economic reagent. A further disadvantage is that the treated solution still contains chloride ions at levels somewhat higher (~50 mg/L) than are desired for optimum operation of a copper electrowinning operation.

It is therefore an object of the invention to provide an improved process for removing dissolved selenium values from acidic aqueous copper sulphate solutions.

According to the present invention, it has been unexpectedly found that dissolved selenium (IV) values can be relatively quickly removed from an acidic aqueous copper sulphate solution by passing the solution through a tubular member in a plug-flow manner, i.e. without any substantial back mixing, and injecting into the solution, as the solution enters the tubular member, a selenium-reducing compound selected from the group consisting of sulphur dioxide and a sulphite solution to produce a selenium containing precipitate.

With such a process, the selenium content of the solution is reduced to a sufficiently low level for copper electrowinning in a relatively short time, for example in as little as about sixty seconds. Also, the selenium-reducing compound used in the process is readily obtainable. The mechanisms of the chemical reactions of the process of the present invention are not clearly understood, although it is believed that the absence of a discrete gaseous phase while the copper-bearing solution and the selenium-reducing compound are passing through the tubular member may be a contributory factor. In this respect, it will be noted that, even if the selenium reducing compound is added as gaseous sulphur dioxide, the sulphur dioxide will substantially all dissolve during flow through the tubular member.

Where the selenium reducing compound is sulphur dioxide, it may be in a gaseous or liquid form or in aqueous solution.

It has been found that, when the acidic aqueous copper sulphate solution contains dissolved selenium (VI) values as well as selenium (IV) values, the ratio of dissolved selenium (IV) values to dissolved selenium (VI)

values should be at least 3:1 to achieve reduction of dissolved selenium (VI) values to a satisfactory low level. The solution may contain from about 1 to about 90 g/L copper, from about 3 to about 210 mg/L selenium (IV) and from about 1 to about 70 mg/L selenium (VI).

Further, it has also been found that, where dissolved nickel values are present in the solution, the solution should also contain at least about 10 g/L cupric ions in order to obtain reduction of the concentration of the dissolved selenium (VI) values to a satisfactory low level. The dissolved nickel concentration may typically be from about 0.1 to about 50 g/L.

Additionally, it has further been found that other variable factors are not particularly critical. For example, the process operates satisfactorily at temperatures ranging from ambient up to about 150° C., and at acidities ranging from about 0.1 to about 200 g/L sulphuric acid. The process has also been found to be satisfactory at linear flow rates through the tubular reactor varying from about 0.5 to about 10 m/sec, and with tubular members of diameter varying from 1 centimeter to about 2.5 centimeters.

The tubular member, sometimes known as a plug-flow reactor or a pipeline reactor, may be of any convenient material, such as stainless steel or plastic-lined steel, which is not adversely affected by solutions flowing therethrough.

The selenium containing precipitate will usually comprise cuprous selenide with a small amount of metallic copper.

Various examples will now be described. In each example, the solution was heated to the desired temperature under an oxygen-free atmosphere in a glass-lined reactor or a stainless steel autoclave, and fed through a tubular member in the form of an insulated stainless steel tube with an outside diameter of 1 centimeter and 30 meters in length. The selenium reducing compound was injected at a controlled rate into the solution stream, via a T-junction at the start of the tubular member. The treated solution was continuously discharged from the end of the tubular member by flashing through a throttle valve into a collection vessel.

EXAMPLE 1

Copper sulphate solution at a pH of about 4 and containing 60 g/L cupric ion was passed through the tubular member at a flow rate of 1 L/min, and sodium sulphite solution was injected to provide an addition rate of 2 g/L $SO_2$. The solution contained 33.3 mg/L selenium (IV) and 9 mg/L selenium (VI) and tests were made at different temperatures ranging from 25° to 150° C. The results are shown in Table I.

TABLE I

| Head Solution (mg/L) | | Solution Temperature (°C.) | Final Solution (mg/L) | | Precipitation Efficiency, (%) | |
|---|---|---|---|---|---|---|
| Se(IV) | Se(VI) | | Se(IV) | Se(VI) | (Se(IV) | Se(VI) |
| 33.3 | 9.0 | 25 | 0.25 | 0.26 | 99.2 | 97.1 |
| 33.3 | 9.0 | 50 | 0.30 | 0.46 | 99.0 | 94.8 |

TABLE I-continued

| Head Solution (mg/L) | | Solution Temperature (°C.) | Final Solution (mg/L) | | Precipitation Efficiency, (%) | |
|---|---|---|---|---|---|---|
| Se(IV) | Se(VI) | | Se(IV) | Se(VI) | (Se(IV) | Se(VI) |
| 33.3 | 9.0 | 100 | 0.30 | 0.75 | 99.0 | 91.7 |
| 33.3 | 9.0 | 125 | 0.30 | 1.34 | 99.0 | 85.4 |
| 33.3 | 9.0 | 150 | 0.35 | 2.10 | 98.9 | 76.7 |

In all cases, both dissolved selenium (IV) values and dissolved selenium (VI) values were reduced to a satisfactory low level. It will be noted that the selenium precipitation efficiency was in fact better at lower than at higher temperatures. It will also be noted that the ratio of dissolved selenium (IV) values to dissolved selenium (VI) values in the original solution was greater than 3:1.

EXAMPLE 2

The tests of Example 1 were repeated with solutions which contained lower concentrations of dissolved selenium (IV) values than selenium (VI) values. In one set of tests, the solution contained 45 mg/L dissolved selenium (IV) values and 68 mg/L dissolved selenium (VI) values, and another solution contained 0.15 mg/L dissolved selenium (IV) values and 113 mg/L dissolved selenium (VI) values. The results are shown in Table II.

TABLE II

| Head Solution (mg/L) | | Solution Temperature (°C.) | Final Solution (Mg/L) | | Precipitation Efficiency, (%) | |
|---|---|---|---|---|---|---|
| Se(IV) | Se(VI) | | Se(IV) | Se(VI) | Se(IV) | Se(VI) |
| 45 | 68 | 25 | 0.13 | 52 | 99.7 | 23.5 |
| 45 | 68 | 50 | 0.13 | 52 | 99.7 | 23.5 |
| 45 | 68 | 100 | 0.13 | 53 | 99.7 | 22.0 |
| 45 | 68 | 125 | 0.15 | 53 | 99.6 | 22.0 |
| 45 | 68 | 150 | 0.15 | 52 | 99.6 | 23.5 |
| 0.15 | 113 | 25 | 0.15 | 102 | — | 9.7 |
| 0.15 | 113 | 50 | 0.15 | 102 | — | 9.7 |
| 0.15 | 113 | 100 | 0.15 | 101 | — | 10.6 |
| 0.15 | 113 | 125 | 0.15 | 99 | — | 12.4 |
| 0.15 | 113 | 150 | 0.15 | 103 | — | 8.8 |

It will be noted that although the concentration of dissolved selenium (IV) values was reduced to a satisfactory low level, the concentration of dissolved selenium (VI) values was not. As indicated earlier, where selenium (VI) values are also present, it is necessary that the ratio of dissolved selenium (IV) values to dissolved selenium (VI) values be at least about 3:1 in order to achieve a reduction of concentration of dissolved selenium (VI) values to a satisfactory low level.

EXAMPLE 3

Solutions containing substantially more dissolved copper values than nickel values were tested in the manner previously described, except that the selenium-reducing compound was sulphur dioxide gas supplied at the rate of 5 g/L. The results are shown in Table III.

Satisfactory results were obtained with respect to selenium (IV) and selenium (VI).

TABLE III

| Head Solution | | | | | Solution Temperature (°C.) | Final Solution mg/L | | Precipitation Efficiency, % | |
|---|---|---|---|---|---|---|---|---|---|
| (g/L) | | | (mg/L) | | | | | | |
| Cu | Ni | $H_2SO_4$ | Se(IV) | Se(VI) | | Se(IV) | Se(VI) | Se(IV) | Se(VI) |
| 80 | 30 | 12 | 90 | 29 | 150 | <0.5 | 2.0 | 99.4 | 93.1 |
| 80 | 30 | 12 | 90 | 29 | 150 | <0.5 | 3.0 | 99.4 | 89.7 |

TABLE III-continued

| Head Solution | | | | | Solution Temperature (°C.) | Final Solution mg/L | | Precipitation Efficiency, % | |
|---|---|---|---|---|---|---|---|---|---|
| (g/L) | | | (mg/L) | | | | | | |
| Cu | Ni | H$_2$SO$_4$ | Se(IV) | Se(VI) | | Se(IV) | Se(VI) | Se(IV) | Se(VI) |
| 80 | 30 | 12 | 90 | 29 | 150 | <0.5 | 2.5 | 99.4 | 91.4 |

EXAMPLE 4

Solutions containing dissolved copper and nickel values, but with the ratio of copper to nickel being somewhat less than in Example 3, were treated in the manner previously described, except that the selenium-reducing compound was sodium sulphite or sodium hydrogen sulphite solution supplied at a rate of 2–5 g/L sulphur dioxide. The results are shown in Table IV.

The results obtained with respect to selenium (IV) and selenium (VI) were again satisfactory.

TABLE IV

| Head Solution | | | | | Solution Temperature (°C.) | Final Solution (mg/L) | | Precipitation Efficiency, % | |
|---|---|---|---|---|---|---|---|---|---|
| (g/L) | | | (mg/L) | | | | | | |
| Cu | Ni | H$_2$SO$_4$ | Se(IV) | Se(VI) | | Se(IV) | Se(VI) | Se(IV) | Se(VI) |
| 60 | 40 | 12 | 54 | 18 | 135 | <0.5 | 5.0 | 99.1 | 72.2 |
| 60 | 40 | 12 | 54 | 18 | 135 | <0.5 | 6.0 | 99.1 | 66.7 |
| 60 | 40 | 12 | 54 | 18 | 100 | <0.5 | 10.0 | 99.1 | 44.4 |
| 60 | 40 | 12 | 54 | 18 | 80 | <0.5 | 7.0 | 99.1 | 61.1 |
| 60 | 40 | 12 | 116 | 34 | 120 | 0.2 | 4.8 | 99.8 | 85.9 |

EXAMPLE 5

Sulphate solutions containing various amounts of dissolved copper and nickel values and dissolved selenium (IV) and selenium (VI) values were treated as in Example 1 and the results are shown in the following Table V

TABLE V

| Head Solution | | | | | Solution Temperature (°C.) | Final Solution (mg/L) | |
|---|---|---|---|---|---|---|---|
| (g/L) | | | (mg/L) | | | | |
| Cu | Ni | H$_2$SO$_4$ | Se(IV) | Se(VI) | | Se(IV) | Se(VI) |
| 0.1 | 80 | — | 0.25 | 1.9 | 125 | 0.2 | 1.7 |
| 0.1 | 80 | — | 55.7 | 4.9 | 25 | 0.25 | 25.6 |
| 0.1 | 80 | — | 55.7 | 4.9 | 125 | 0.33 | 28.0 |
| 2.0 | 70 | 5 | 210 | Nil | 125 | <0.1 | 60.8 |
| 6.6 | 70 | 5 | 210 | Nil | 125 | <0.1 | 13.0 |

It will be noted that where the dissolved copper concentration is low, the resultant dissolved selenium (VI) concentration is high when the original dissolved selenium (IV) concentration is high. It therefore appears that, when the dissolved copper concentration is too low, the presence of dissolved nickel values results in the oxidation of dissolved selenium (IV) values to dissolved selenium (VI) values. In order to achieve the reduction of dissolved selenium (VI) values to a satisfactory level therefore, it is necessary that the dissolved copper concentration be at least about 10 g/L when significant concentrations of dissolved nickel values are also present.

EXAMPLE 6

Further tests were made on solutions containing dissolved copper and nickel values at different acidities and with different concentrations of dissolved selenium (IV) values and dissolved selenium (VI) values. The results are shown in the following Table VI.

TABLE VI

| Head Solution | | | | | Solution Temperature (°C.) | Final Solution (mg/L) | |
|---|---|---|---|---|---|---|---|
| (g/L) | | | (mg/L) | | | | |
| Cu | Ni | H$_2$SO$_4$ | Se(IV) | Se(VI) | | Se(IV) | Se(VI) |
| 60 | 38 | 20 | 77 | 8 | 120 | 0.20 | 5.3 |
| 60 | 38 | 20 | 87 | 25 | 120 | 0.16 | 5.2 |
| 60 | 38 | 20 | 83 | 15 | 120 | 0.12 | 5.8 |
| 33 | 60 | 15 | 1.0 | 14 | 150 | 0.20 | 12.3 |
| 33 | 60 | 15 | 1.0 | 14 | 150 | 0.20 | 11.5 |
| 33 | 60 | 15 | 1.0 | 14 | 150 | 0.20 | 11.6 |

The first three tests give satisfactory results and it will be noted that the initial ratio of dissolved selenium (IV) values to dissolved selenium (VI) values is at least 3:1. This is not the case in the last three tests, and it will be seen that the results were unsatisfactory so far as the final concentrations of dissolved selenium (VI) values were concerned.

EXAMPLE 7

Tests were carried out at different flow rates with the solution containing 60 g/L copper, 30 g/L nickel, 10 g/L sulphuric acid at a temperature of 130° with a tubular member 90 meters in length and with the addition of Na$_2$SO$_3$ to provide an addition rate of 2.5 g/L SO$_2$. The solution contained 111 mg/L dissolved selenium (IV) and 28 mg/L dissolved selenium (VI). The results are shown in Table VII.

TABLE VII

| Head Solution (mg/L) | | Solution Flow Rate L/min | Final Solution (mg/L) | | Precipitation Efficiency, % | |
|---|---|---|---|---|---|---|
| Se(IV) | Se(VI) | | Se(IV) | Se(VI) | Se(IV) | Se(VI) |
| 111 | 28 | 8 | 0.13 | 3.3 | 99.9 | 88.2 |
| 111 | 28 | 4 | <0.10 | 4.0 | 99.9 | 85.7 |
| 111 | 28 | 2 | <0.10 | 4.5 | 99.9 | 83.9 |
| 111 | 28 | 1 | 0.10 | 3.8 | 99.9 | 86.4 |
| 111 | 28 | 0.5 | 0.13 | 3.7 | 99.9 | 86.8 |

It will be seen that favourable results were obtained with flow rates ranging from 0.5 to 8 L/min.

It is believed that the above examples clearly demonstrate the advantages of the present invention, the scope of the invention being defined in the appended claims.

What we claim as new and desire to protect by Letters Patent of the United States is:

1. A process for removing dissolved selenium values from an acid aqueous sulphate solution containing dissolved selenium (IV) values and dissolved selenium (VI) values, the ratio of dissolved selenium (IV) values to dissolved selenium (VI) values being at least 3:1, comprising passing said solution through a tubular member in a plug flow manner and injecting into the solution, as the solution enters the tubular member, a selenium-reducing compound selected from the group consisting of sulphur dioxide and a sulphite solution to reduce the concentrations of dissolved selenium (IV) values and dissolved selenium (VI) values to satisfactory low levels by production of a selenium-containing precipitate.

2. A process according to claim 1 wherein the solution contains from about 1 to about 90 g/L dissolved copper, from about 3 to about 210 mg/L dissolved selenium (IV) values and from about 1 to about 70 mg/L dissolved selenium (VI) values.

3. A process according to claim 1 wherein the solution also contains from about 0.1 to about 50 g/L dissolved nickel values, and the solution also contains at least about 10 g/L cupric ions.

4. A process according to claim 1 wherein the selenium-reducing compound comprises sodium sulphite solution or sodium hydrogen sulphite solution.

5. A process according to claim 1 wherein the selenium-reducing compound comprises aqueous sulphur dioxide solution.

6. A process according to claim 1 wherein the selenium-reducing compound comprises liquid or gaseous sulphur dioxide.

* * * * *